United States Patent [19]

Hill, Jr.

[11] 4,155,100
[45] May 15, 1979

[54] SYNCHRONOUSLY OPERATIONAL CAMERA SYSTEM

[76] Inventor: Benjamin T. Hill, Jr., 6842 Ranchito Ave., Van Nuys, Calif. 91405

[21] Appl. No.: 894,217

[22] Filed: Apr. 7, 1978

[51] Int. Cl.² .............................................. H04N 5/22
[52] U.S. Cl. .................................... 358/183; 358/210
[58] Field of Search ............... 358/210, 149, 180, 183

[56] References Cited
U.S. PATENT DOCUMENTS

| | | | |
|---|---|---|---|
| 3,944,731 | 3/1976 | Busch | 358/183 |
| 4,092,673 | 5/1978 | Adams | 358/183 |

*Primary Examiner*—Richard Murray
*Attorney, Agent, or Firm*—Harry R. Lubcke

[57] ABSTRACT

A camera control system in which one or more slave cameras are made to follow the motional and/or optical (zoom) adjustments of a master camera.

Each motional or optical parameter is represented by a train of pulses related to the master camera, which pulses are digitally processed.

Corrections to a parameter to insure accurate synchronous tracking are made by changing the effective number of pulses in a train of pulses according to a predetermined correction program. The corrected pulse trains power each slave camera by energizing pulse-responsive actuators on the slave cameras.

10 Claims, 6 Drawing Figures

SYNCHRONOUSLY OPERATIONAL CAMERA SYSTEM

BACKGROUND OF THE INVENTION

The matting process for combining scenes has been used in the motion picture industry for nearly as long as motion pictures have been known. Various names have identified this process; i.e., the "Dunning Process," "Blue Backing," "Sodium Vapor Lighting Matte," and others.

In practice, the foreground action is photographed using one of the above processes and then a suitable background is photographed separately. The foreground has usually consisted of actors in a studio, while the background has been a scene from a foreign land, a forest, or some other scene that would be difficult to construct in the studio.

The two images have been subsequently combined into a single image by using an optical printer.

The two negatives are photographed separately. Thus, any relative motion between the two cameras during the photographing process will be easily seen and will be detrimental in the attempt to achieve realism.

As a result, most matte shots are rather static in nature. The action is limited to movements of a foreground object or persons, while the cameras remain stationary.

Television production has been similarly restricted.

In television the matting process is all-electronic; through the use of "Chroma-Key," "Technimatte," "Image-Matte," or a similar process.

The rigid technical constraints remain. When the two cameras are matted in registration, any movement of one camera must be precisely duplicated by the other camera, or a disturbing relative motion results.

A system known as "Magicam" has been disclosed in U.S. Pat. Nos. 3,902,798 to Trumbull et al, Sept. 2, 1975, and 3,914,540 to Slater, Oct. 21, 1975; and in the A.S.C. journal, "American Cinematographer," Vol 56, No. 1, January 1975, page 34, et seq.

This system uses exclusively a servo-motor-amplifier control to obtain synchronization of camera movements. A special floor is used for the foreground camera that is smooth to 1/32 inch (0.8 millimeter) over the large area desired. A special sensored camera dolly is used.

This invention pertains to a method and an apparatus for synchronizing two or more cameras with respect to motion and optical characteristics.

BRIEF SUMMARY OF THE INVENTION

Typically, a train of pulses of equal amplitude and variable spacing is formed for each parameter to be controlled; such as "pan" (horizontal rotation), "tilt" (vertical rotation), and "zoom" (change of focal length of the camera lens).

Poor mechanical and electrical alignments in the cameras, inaccurate lens mounts, and off-axis lens elements, as well as variation of the nodal point of a zoom lens as its focal length changes to give a more nearly close-up or more nearly long-shot field of view, all require motional correction on the pan and/or tilt axes, as well as for residual variation in the direction of the optical axis of the zoom lens. Thus, the correction pulses originate with the zoom movement and are applied to the pan and tilt axes of the following (slave) camera to eliminate the cosine error caused by the change of the nodal point of the zoom lens as it zooms, as well as the gross mechanical and electrical errors between the cameras.

An initial pulse-inhibiting step insures synchronous tracking of the zoom optical change of master and slave(s) zoom camera lenses.

DESCRIPTION OF THE PREFERRED EMBODIMENTS

In an overview, the motional element of the pan and the tilt axes of a known pan and tilt head for a television camera and the zoom (variable focal length) rotational handle are each provided with electrical pulse-producing generators, on the master camera.

The pulse signals from each are separately digitally amplified.

Correction pulse signals, in quadrature phase, are produced by instrumentalities according to this invention, and are combined with the original pulse signals from the generators on an individual basis. These pulses have the effect of adding to or subtracting from, the number of pulses originally generated.

All pulses have the same amplitude, as is true of digital type apparatus. An analog manner of handling the pulse signals, as by variable amplitude, is absent.

The corresponding motional elements on one or more slave cameras are provided with stepper motors that are motionally responsive to the train of pulses with which they are provided.

The motion of the master camera is thus reproduced in the slaves.

Figure 1:
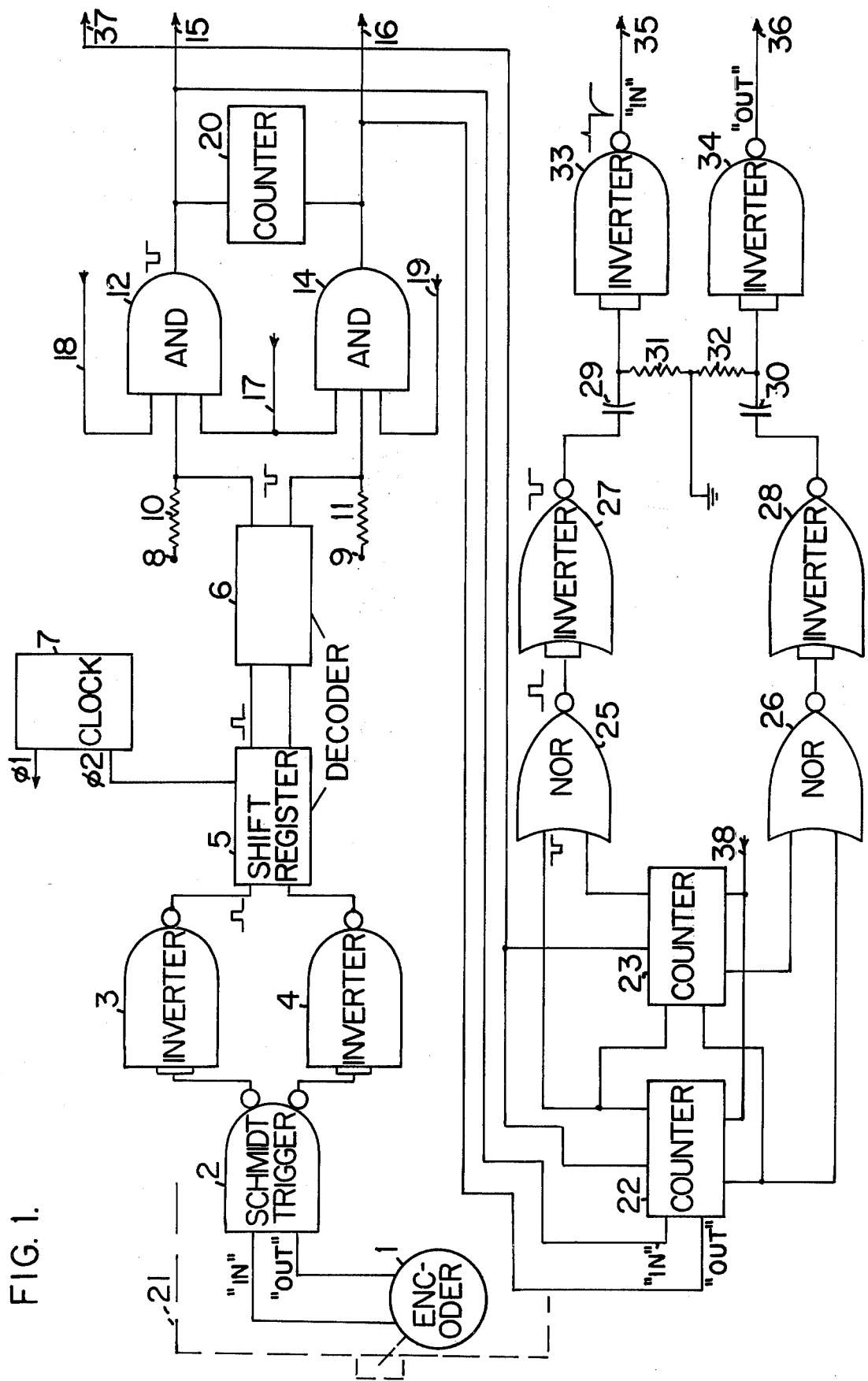
FIG. 1 shows the initial elements of the zoom lens logic in schematic circuit form. Certain connections at the right of the figure connect to corresponding connections at the left in FIG. 2.

In FIG. 1, numeral 1 identifies the pulse generator that is attached to the zoom control handle of the master camera. This handle and the master camera have not been illustrated, in detail, since the mechanical, optical and electrical characteristics of such a color or black and white television, film, or equivalent camera are known. Master camera 21 and a slave camera 24 are shown inferentially in FIGS. 5, 6, and elsewhere.

Element 2 is an integrated circuit Schmidt trigger "nand" gate that acts as a pulse shaper; i.e., that the upward and downward excursions and the maximum value and zero axis shall all be rectilinear strokes. This gate may be of the 7413 type. The duty cycle of the pulse waveform is in the range of from 10% to 20%, with a corresponding dwell at zero axis of 90% to 80%, respectively. The polarity of the pulses at the various parts of the electrical circuit is given by small waveforms adjacent to the part of the circuit in which they flow, in FIG. 1, and elsewhere.

The negative polarity pulses that constitute the two outputs of gate 2 are changed to positive polarity by parts of a type 7404 Hex inverter that are identified by numerals 3 and 4.

The positive polarity pulses enter the two inputs of decoder 5, which may be a type 74195 integrated circuit, and from thence at the same polarity to the second element of the decoder, 6. The latter may be a type 74156.

An input from a two-phase clock 7 drives element 5 of the decoder. This is the second phase of the clock and is 180° out of phase with the first phase of the clock. A non-interference function of this aspect will be made evident later.

Pulse generator 1 provides two outputs, at a 90° phase difference apart. When these two trains of pulses are decoded the direction in which the motion driving the pulse generator is obtained. The pulse generator may also be termed an encoder, of incremental type. Of the double input to "nand" gate 2, the upper one is identified with a motion "in" of the zooming of the lens, while the lower one is identified with a motion "out."

Passing on from the double output of decoder element 6, plus 5 volts energizing power supply is provided at terminals 8 and 9 and through resistors 10 and 11, which may each have a resistance of 1,000 ohms, the potential is impressed upon the output conductors. These for the center input to each of two "and" elements 12 and 14 form one of three possible inputs to each gate. These may be type 7411.

Considering the normal condition of gates 12 and 14, which is when the output from decorder element 6 is passed through the gates; when the zoom motion from encoder 1 is "in" a pulse output will appear at terminal 15, when the motion is "out" the output will appear at terminal 16.

The other inputs to "and" gates 12 and 14 have to do with manual control rather than automatic tracking control as has above been described.

It is desirable, if not necessary, to provide for manual control by an operator of the slave camera(s), so that a desired relation can be established between the master camera and the slave camera(s).

Accordingly, a small manual control console is provided, having push-buttons, read-outs, etc., to handle the operator interface to the logic of FIG. 1. Since such a console is known it has not been shown, per se.

The voltage sources 8, 9 and resistors 10, 11, serve "and" gates 12 and 14 as a wired "or" input that is "high" constantly for the center input of these gates.

When each of the other two of the inputs to each gate is also "high" (at a positive potential rather than at zero potential, which latter is "low") the automatic tracking pulse from decoder element 6 pass through the gates.

When it is desired to disable any and all control by this part of the logic, a manual control "disable" electric signal is impressed upon conductor 17 and therefrom to the inputs nearby in FIG. 1. This merely requires the "high" potential to be removed, thus substituting a "low" signal. The "and" gates 12 and 14 are thereby deprived on these inputs of a "high" potential, and so will not conduct an output no matter what the other two inputs would be.

For manual control of the zoom lens "in" a series of pulses of any desired duration is impressed upon conductor 18, which is the upper input of gate 12.

The pulses are generated by a pulse clock, the output of which passes to conductor 18 when a push-button or equivalent is operated upon the manual control console.

For manual control of the zoom lens "out" a series of pulses of any desired duration is impressed upon conductor 19, which is the lower input to gate 14.

Counter 20 receives an input from either the output of gate 12 or gate 14. It counts the number of pulses therefrom. By means of a visual read-out capability the operator can determine how many pulses have passed; thereby to know how long to depress the push-button for passing pulses to conductor 18, for example, for any selected number of pulses.

Figure 2:
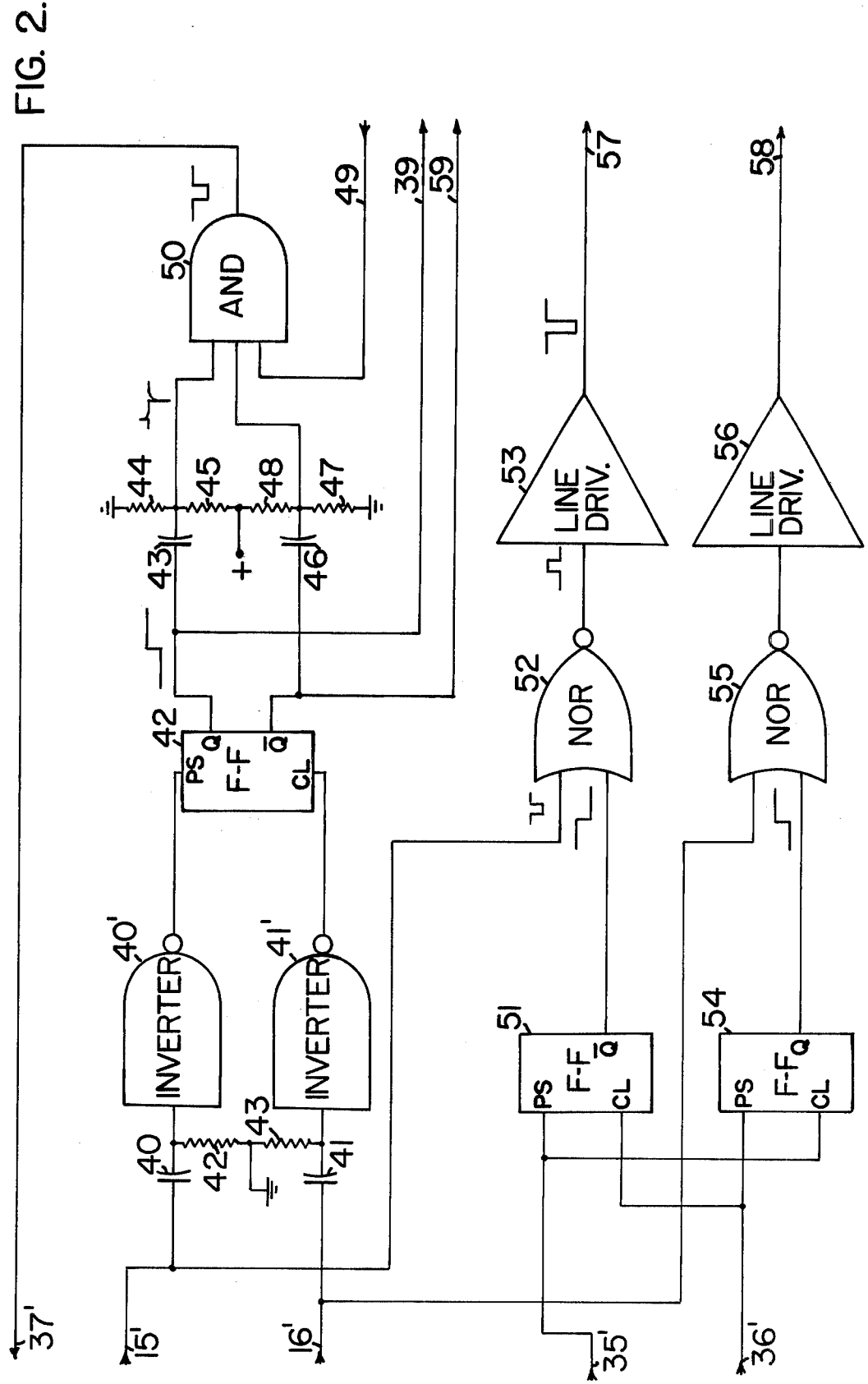
FIG. 2 similarly shows intermediate circuit elements of the zoom lens logic.

In addition to providing an output to further logic of FIG. 2, the "in" output from terminal 15 is connected to one terminal of counter element 22. "Out" terminal 16 is similarly connected to another terminal of counter 22.

Counter element 23 is connected to the output of counter element 22. These are each pre-settable, binary, up/down hexadecimal counters. They may both be of the 74193 type.

These counters are used in the circuit that compensates for the differing backlash in zoom lens mechanisms.

In practice, when the zoom lens handle is rotated to change the focal length of the zoom lens, a backlash lag is invariably noted.

In practicing this invention the zoom lens with the shortest lag is always placed on the slave camera. By so doing it is then only necessary to delete "n" control pulses from the pulse train from the master camera to make the effective backlash of the master and slave zoom lenses equal.

The desired number of pulses to be counted is pre-set into counters 22 and 23 by thumbwheel switches associated therewith. As the zoom handle is rotated encoder 1 delivers pulses and counters 22 and 23 start counting. When the pre-set number has been reached, this is sensed and decoded by integrated circuit 2 input "nor" gate, quad 25, 26, 27, 28. The then coincident outputs of counters 22 and 23 cause the quad to emit and invert a pulse.

This pulse is differentiated by capacitors 29, 30, and resistors in shunt to ground 31, 32, and inverters 33, 34 connected thereto.

The former of each group of elements supplies an output pulse to "in" terminal 35, while the latter group supplies an output pulse to "out" pulse terminal 36. Each capactior may have a value of 0.01 microfarada and each resistor 1,000 ohms.

Terminal 37 receives an output from FIG. 2 and connects to counters 22 and 23 to allow entry of manual "load" pulses into these counters from the manual control console.

Another connection, 38, enters counters 22 and 23 to "clear" the same.

Considering FIG. 2, the "in," "out" outputs from terminals 15 and 16 in FIG. 1 enter the circuit of FIG. 2 at terminals 15' and 16'. These terminals connect directly to two differentiating capacitor-resistor pairs 40 through 43, which are the same as previously described group 29 through 32.

Active elements 40' and 41' are connected to the respective capacitors and provide the isolation required for the differentiation process. These may be parts of hex inverter.

The outputs therefrom enter the PS and CL inputs of flip-flop 42. This flip-flop is set or re-set according to the directional output from "and" gates 12 and 14 of FIG. 1. A pulse is thus generated each time encoder 1 changes direction.

The $\overline{Q}$ output from flip-flop 42 is connected to capacitor 43, which, in turn, is connected to the common connection between resistors 44 and 45. The other connection of resistor 44 is connected to ground, while the other connection of resistor 45 is connected to a voltage source of, say positive 5 volts.

Capacitor 43 may have a capacitance of 0.1 ufd, while resistors 44 and 45 may have a resistance of 2,200 and 1,000 ohms, respectively.

Capacitor 43 and resistor 44 constitute differentiation means as did capacitor 29 and resistor 31 in FIG. 1.

Resistor 45 and the voltage source constitute a wired "or" gate, as was explained with respect to resistor 10 and source 8 in FIG 1.

The Q output from flip-flop 42 is connected to capacitor 46, which, in turn, is connected to the common connection between resistors 47 and 48. The other connection of resistor 47 is connected to ground, while the other connection of resistor 48 is connected to a voltage source of, say, positive 5 volts.

The capacitor and resistor values are the same is those for elements 43, 44, 45. The functions performed are also the same.

The rising or the falling edge of the pulse output from flip-flop 42 is differentiated and is applied to two of the terminals of three-terminal "and" gate 50. This then becomes the trailing edge pulse that loads counters 22, 23 with the appropriate number of pulses at the required time.

A third input 49 to gate 50 allows manual loading of the counters, when required. This input comes from the manual console and preserves a "high" potential when not providing manual control so that the gate can be enabled from flip-flop 42.

The output of gate 50 is connected to terminal 37' in FIG. 2 to terminal 37 in FIG. 1, and thence to both counters 22 and 23.

The pulse output of flip-flop 42 is also directed to a BCD Hexadecimal thumbwheel switch on the manual console that is labeled "zoom," via conductors 39 and 59.

Whether this output is "high" or "low" determines what number will be preset into the counters 22 and 23. That is, the required number is preset, depending upon whether the next move of the counter will be up or down.

As an example, if 10 counts are required—counting up—the counter is set at 6. The 10 pulses come in, and as the counter reaches 15 and then changes to zero for the 16th count a pulse is emitted by the counter as a "carry."

If the move is "down," the counter must be set at the binary complement of 6, which is 9. The counter counts down to zero and when it resets to 9 it emits a "borrow" pulse, and a count total of 10 is again achieved.

The above arrangement gives the correct pre-set delay no matter which way the cameraman makes a "zoom."

The output from terminals 35 and 36 of FIG. 1 enters the circuit of FIG. 2 at terminals 35' and 36'.

Terminal 35' is connected to the PS input of flip-flop 51, while terminal 36' is connected to the CL input thereof.

The $\overline{Q}$ output of the flip-flop is connected to one input of "nor" gate 52. The other input thereof is connected to terminal 15', which carries pulses from that part of the circuit connected to terminal 15 in FIG. 1.

The "nor" gate 52 functions in a negative logic manner. An output from $\overline{Q}$ of flip-flop 51 enables gate 52 to pass the pulses entering it from terminal 15'.

Figure 3:
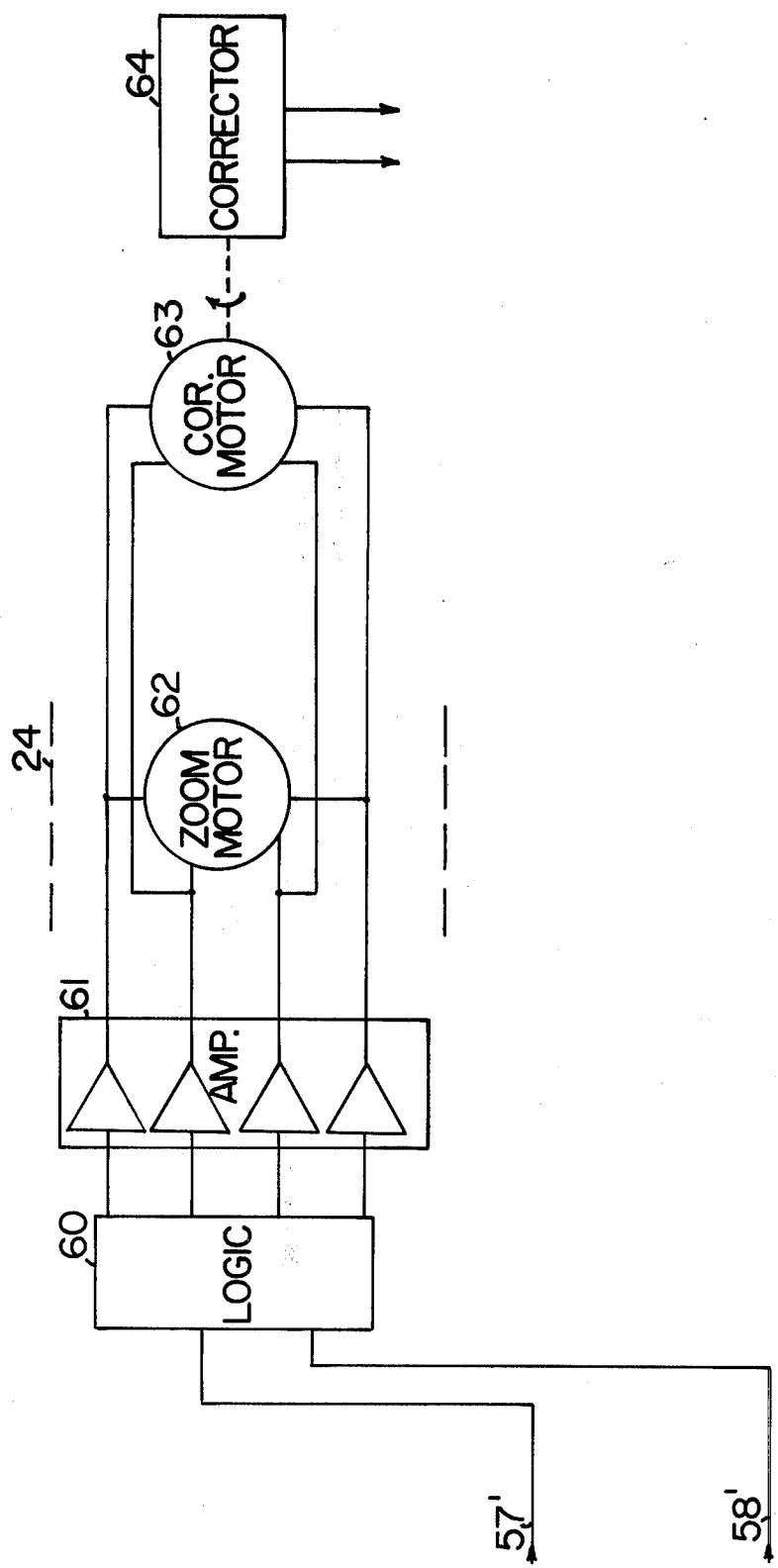
FIG. 3 similarly shows final circuit elements of the zoom lens logic.

Such passed pulses enter level-shifting line-driver 53, which changes a 5 volt pulse input to a 12 volt pulse that is used to drive the stepper motor amplifier of FIG. 3. The polarity of the pulse is also inverted.

The bottom row of elements in FIG. 2 are a substantial duplicate of the lower-center row of elements that have just been described.

Terminal 36' is connected to the PS input of flip-flop 54, while terminal 35' is connected to the CL input thereof.

The $\overline{Q}$ output of the flip-flop is connected to one input of "nor" gate 55. The other input thereof is connected to terminal 16', which carries pulses from that part of the circuit connected to terminal 16 in FIG. 1.

The "nor" gate 55 also functions in a negative logic manner. An output from $\overline{Q}$ of flip-flop 54 enables gate 55 to pass the pulses entering it from terminal 16'.

Such passed pulses enter level-shifting line-driver 56, which changes a 5 volt pulse input to a 12 volt pulse that is used to drive the stepper motor amplifier of FIG. 3. The polarity of the pulse is also inverted.

The circuit of FIG. 2 provides the same delay in passing pulses to the slave stepping motor in the "in" direction as in the "out" direction. This preserves the accuracy of zoom tracking in both directions, since the "slack" in the slave lens is the same in one direction as it is in the reverse direction. The cameraman is thus free to make any changes in zooming without a thought as to tracking.

The required drive pulses for the slave stepper motor leave FIG. 2 at terminals 57 and 58.

These pulses enter the circuit of FIG. 3 at terminals 57' and 58'.

A four phase stepper motor is suitable for driving the slave zoom lens. Thus, connections are made from terminals 57' and 58' to four phase logic for the stepper amplifier. The logic is element 60, while the stepper amplifier per se is element 61.

These may be Superior Electric Co. Type STM 1800 C Translator Module.

The stepper motor steps upon the downward excursion of the incoming pulse.

Amplifier 61 has a four wire connection to zoom lens stepper motor 62, which motor is mechanically coupled to the zoom lens focal length adjusting mechanism (i.e., the "zoom" lens element movement).

Amplifier 61 also has a four wire connection to corrector stepper motor 63.

Both of these motors may be the Superior Electric Model MO61-FC08, 7–8 amperes.

Element 64 is the corrector. It provides correction pulses for the pan and tilt master-slave circuits required because of zoom optical changes when the zoom capability of the system is exercised.

Figure 4:
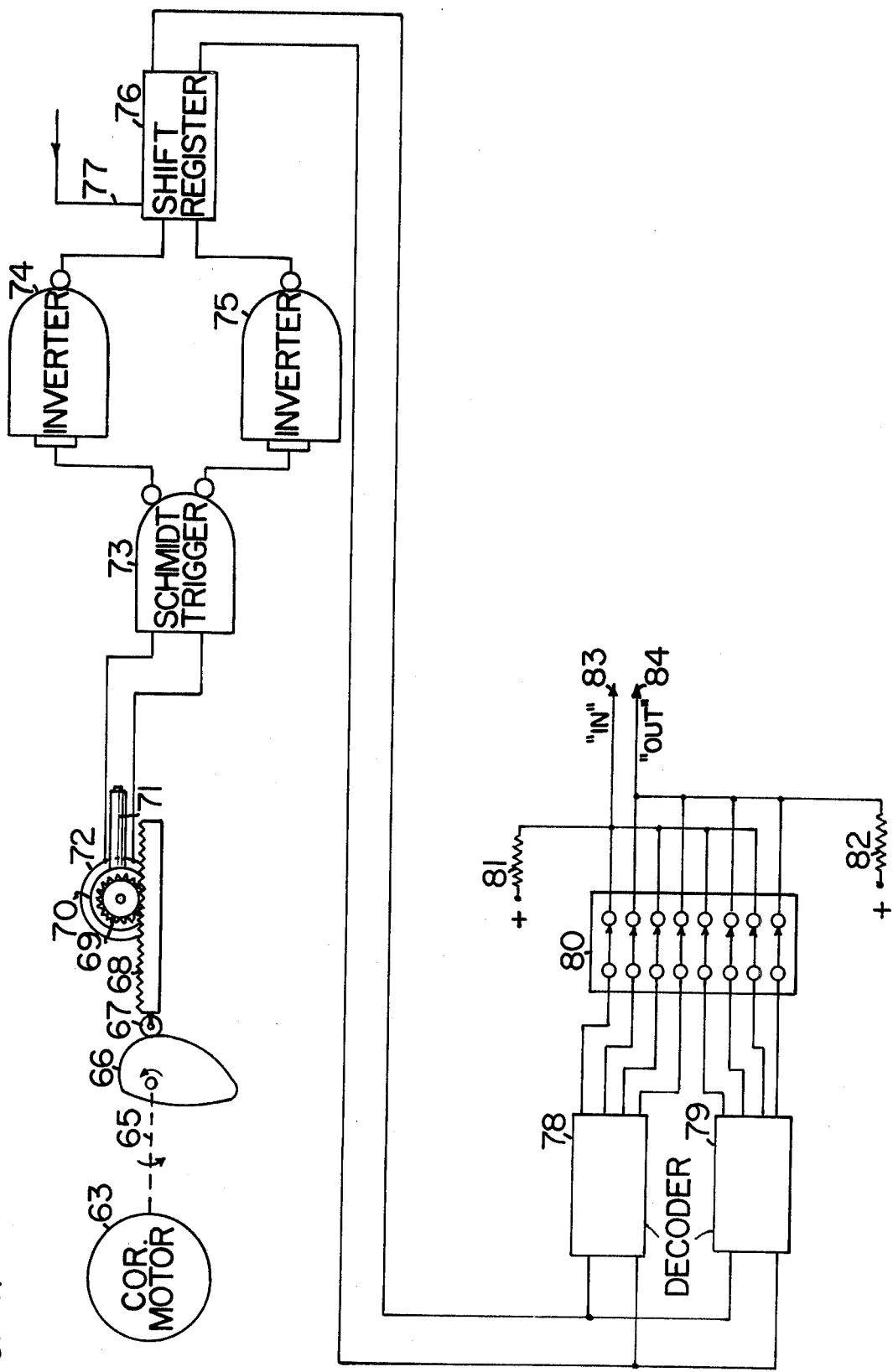
FIG. 4 similarly shows correction pulse circuit elements, including certain mechanical elements.

Element 64 includes the electrical circuits and certain mechanical elements that are illustrated in detail in FIG. 4.

The input information to the apparatus of FIG. 4 is mechanical. Stepper motor 63, the source, is controlled as has been set forth in FIG. 3.

Means to give a speed reduction from the speed of revolution of the stepper motor is required, which may be a gear toothed belt operating between known gearsprockets. This is element 65, and the sprocket-belt combination preferably has a reduction ratio of 19.5 to 1. Known element 65 is shown schematically in FIG. 4.

Cam 66 is rotated by belt drive 65. With the reduction ratio given a full range of the zoom lens encoder 1, of 1,950 steps, will turn the cam exactly 180°.

The shape of cam 66 depends upon the characteristic of the zoom lens employed. This characteristic is typically logarithmic, but may be linear, or may be exponential. The cam is replaceable. Thus, the system can be suited to any type of zoom lens, and by conforming the shape of the cam can be specifically adapted for any given lens.

A cam follower 67 bears upon the surface of the radial cam. It is held in contact with a compression spring (not shown) that urges it toward the cam.

A gear-toothed rack 68 is rigidly mechanically coupled to the cam follower.

A pinion gear meshes with the rack, being element 69 and preferably being of the two piece spring-loaded type to insure a drive from the rack that is devoid of backlash.

The pinion is mounted upon, and drives a mechanical ball-disk integrator 70, which mechanically divides the cam motion to yield the required pulses for accomplishing the correction steps of the slave stepper motor.

The ball-disk integrator is set to the desired ratio by using a micrometer thimble 71. This adjustment moves the ball radially with respect to the disk which drives the ball, so that relatively many revolutions of the ball will occur for a given rotation of the disk when the ball is near the periphery of the disk, and vice versa.

The micrometer allows the integrator to be pre-set to give the desired number of correction pulses.

A digital readout may be provided to count the steps and allow the micrometer corrector to be easily set.

Integrator 70, in turn, drives incremental encoder 72. This is a mechano-electrical transducer that generates electrical pulses according to mechanical rotation. It may be photo-electric in construction, having a source of light, a peripherally perforated opaque disk that is rotatable, and photo-electric responsive means for generating the electrical pulses.

The logic immediately following encoder 72 is the same as that following encoder 1 in FIG. 1.

Element 73 is a Schmidt trigger "nand" gate that acts as a pulse shaper, and may be a 7413 type.

The negative polarity pulses that constitute the two outputs of gate 2 are changed to positive polarity by parts of a type 7404 Hex inverter that are identified by numerals 74 and 75.

The positive polarity pulses enter the two inputs of decoder element 76, which may be a type 74195 integrated circuit.

The second phase from two-phase clock 7 of FIG. 1 enters decoder 76 via conductor 77.

The outputs of decoder element 76 are connected in parallel with the inputs of further decoder elements 78 and 79.

Element 76 is a four bit parallel access shift register, while elements 78 and 79 are each two line to four line decoders. The latter are the 74156 type.

Each decoder element 78 and 79 provides four outputs. These all are connected to digital switch 80; one output to one pole of the switch. The switch has 8 poles and is single throw. Switch 80 is a physical switch and may be of the DIP size and construction for mounting on a printed circuit board.

A wired "or" gate configuration is provided by resistors 81 and 82, each of which are connected to a positive voltage source. The resistance of the resistors may be 1,000 ohms and the voltage of the source 5 volts.

The upper output of decoder 78 passes through to "in" output terminal 83. The next lower output passes through to "out" output terminal 84. The upper output is connected to resistor 81, the next lower is connected to resistor 82. The second lower output is again connected to terminal 83 and to resistor 81. The remaining outputs alternate in connection according to the pattern described.

The function of the decoder elements in each case is to decode the quadrature pulses produced by the encoders, such as 1, 72, etc., thereby to determine which direction a master move has been made. The rate at which the pulses come from the encoders is the index of the speed with which the motion involved is being carried out.

Figure 5:
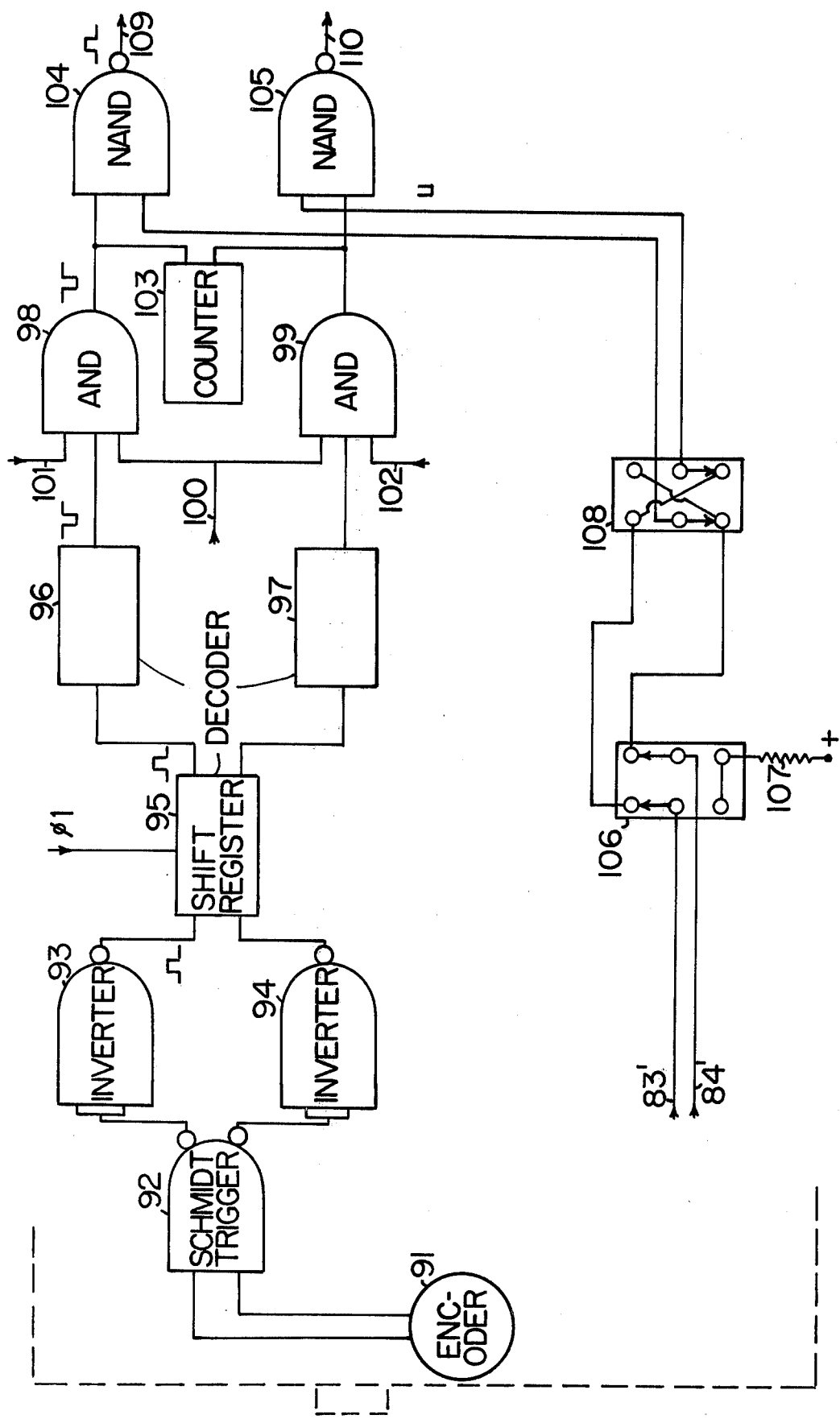
FIG. 5 similarly shows logic suitable for the pan control of the cameras, and, duplicated, for the tilt control of the cameras as well.

The logic of FIG. 5 generally follows that of FIG. 1. FIG. 1 describes, shows, the logic for providing pulses for slave camera(s) in zoom lens control. FIG. 5 shows the same for the pan motion of the cameras and a duplicate of the same handles the tilt motion of the cameras.

In FIG. 5, numeral 91 identifies the pulse generator, or encoder, that is attached and provided with rotational motion each time the master camera is "planned." It is located upon the pan portion of the known pan and tilt head upon which the television camera, etc. is mounted.

Encoder 91, as before, generates a two track train of pulses that are quadrature related; that is, each of the pulses in the two trains are displaced from each other by 90°. This allows accurate determination of the direction of motion of the pan head by the use of logic shown also in FIG. 5.

Element 2 is an integrated circuit (preferably) Schmidt trigger "nand" gate that acts as a pulse shaper; to give a rectilinear waveform. This gate may be of the 7413 type.

The negative polarity that constitutes the two outputs of the pulses from gate 92 is changed to positive polarity by parts of a type 7404 Hex inverter that are identified by numerals 3 and 4, previously, now by 93 and 94.

The positive polarity pulses enter the two inputs of decoder 95, which may be a type 74195 integrated circuit; this element also receiving a phase one input from clock 7 of FIG. 1.

This clock input being phase one and the zoom logic counter input being phase two, correction pulses to the pan motion of the slave camera that originates in the zoom logic will never occur at the same time as the pan motion pulses per se occur. This is important in the operation of the slave stepper motors, since such motors respond only to pulses that are separately spaced.

As embodied herein the two sets of pulses occur midway between each other.

Further elements of the decoder in FIG. 5 are two elements 96 and 97 that are separately connected to the two outputs of element 95. The two elements may both be type 74156.

The pair of "and" gates 98 and 99 are similar in connection and function to element 12 and 14 of FIG. 1. They are all type 7411, having three inputs each. The center input to each gate is connected to the output of the decoder. The inner inputs are connected together and to a manual control "disable" from conductor 100.

This was previously explained in connection with the equivalent prior conductor 17.

Upper conductor 101 conveys an appropriate potential from a manual direction control switch, enabling "up" if this logic is for the tilt axis of the camera and "right" if this logic is for the pan axis of the camera.

Similarly, lower conductor 102 of gate 99 conveys an appropriate potential from a manual control switch, enabling "down" if this logic is for the tilt axis of the camera and "left" if this is for the pan axis of the camera.

Counter 103 receives an input from either the output of gate 98 or gate 99. It counts the number of pulses therefrom. By means of a visual read-out capability the operator can determine how many pulses have passed; thereby to know how long to depress the push-button for passing pulses to conductor 101, for example, for any selected number of pulses.

Counter 103 also counts and displays each pulse step generated by encoder 91 and makes it possible to return the motion to the starting point, if that is desired.

"Nand" gate 104 is a two-input type 7400 element, one input of which is connected to "and" gate 98, and the other to the correction signal available at terminal 83 of FIG. 4.

This correction signal appears at terminal 83' in FIG. 5.

Similarly, "nand" gate 105 is a two-input type 7400 element, one input of which is connected to "and" gate 99, and the other to the correction signal available at terminal 84 of FIG. 4.

This correction signal appears at terminal 84' in FIG. 5.

The origin and nature of the correction signals, pulses, have been set forth above. Restating the purpose, they are for modifying the motion of the pan and/or tilt camera head to make these conform in both cameras, mast and slave, to the position of the optical axis of the zoom lens, as the same is zoomed. This includes the cosine component and goes to what the cameras "see," rather than to the geometrical orientation of the physical structure.

In FIG. 5 conductors from corrector pulse input terminals 83' and 84' connect to the center pair of connections of an "on-off" switch. This may be a double-pole double-throw switch 106, in which the center pair of connections connect to the switch blades.

When the blades are in contact with the upper jaw contacts, as shown, such corrector pulses as are produced are passed on to "nand" gates 104 and 105.

When the blades are in contact with the lower jaw contacts terminals 83' and 84' are disconnected from the rest of the circuit. Instead, a positive potential is impressed upon gates 104 and 105 in order to keep them responsive to usual pulses from elements 98 and 99. The positive potential is obtained by connection of the lower jaw contacts to a positive potential source, say of 5 volts, through a resistor 107, which may have a resistance of 1,000 ohms.

In tandem with switch 106 is reversing switch 108. This may be the known double-pole, double-throw switch that is "X" cross-wired, as shown.

Other mechanical or electronic switches that are equivalent may be substituted.

The basic pan pulses, with or without correction pulses also, depending upon the use of the system at any particular instant, appear at terminals 109 and 110.

Figure 6:
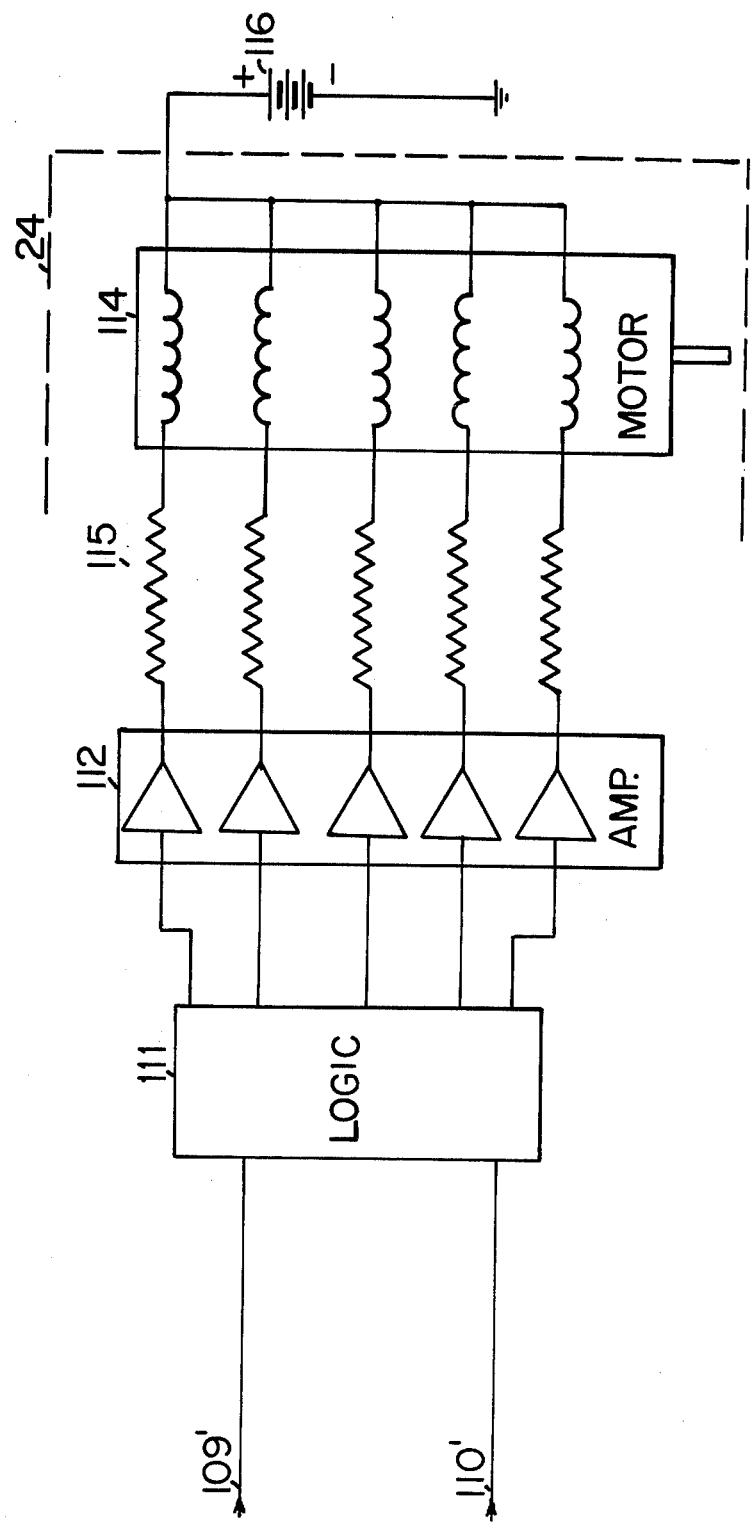
FIG. 6 similarly shows stepper motor drives, which, duplicated, connect to the logic for pan and tilt from FIG. 5 and provide the pan and tilt motions for the cameras.

These pulses enter the circuit of FIG. 6 at terminals 109' and 110'.

A five phase stepper motor is desirable for driving the slave pan motion.

This is so in order to provide a desired speed of this motion. As an example, encoder 91 delivers 8,000 pulses per turn of its shaft. The five phase stepper motor takes steps of 1.8°. It is desired that the steps taken by th camera be smaller than that, approximately eighteen seconds of arc (18"). A gear reduction in the head accomplishes this.

Also, since the correction to the camera pan axis, for example, may actually move the camera backward after it has completed a given forward excursion, the speed of operation may be up to 4,000 steps per second. The forward excursion may be 25 steps to the right, followed by 1 step to the left, to accomplish the correction.

Parenthetically, the slave drive for the zoom motion of the zoom lens does not require the speed required by the pan motion. This, encoder 1 need give only 600 counts per turn and a four phase stepper motor, 62, suffices to supply the slave zoom motion.

In FIG. 6, logic 111 and power amplifier 112 comprise, for example, a Computer Devices Co. driver, Model M65, 5 phase, 6 ampere. Pulse input on the conductor from terminal 109' causes the motor to step in one direction, pulse input on the conductor from terminal 110' causes the motor to step in the opposite direction.

The stepper motor per se is element 114, with a resistor of the group 115 present in each phase.

This may be a Computer Devices Co. step motor, Series 23F-200 , five phase, VR.

This motor is operated from a direct current supply, which has a voltage of 28 volts, and is shown in FIG. 6 as a battery, 116.

It will be understood that since stepper motors move only in discrete steps at the command of pulses from digital circuitry, master and slave camera motions are locked together in an open loop digital servo system.

Typically, one step from the master camera is represented by one pulse in the circuitry and causes one step at the slave camera in any of the motions.

At the slave camera both the pan and the tilt motions are provided by a worm gear and worm mechanism that driven by separate 5 phase stepper motors through a speed-reducing gearbelt. The use of variable bearing mounts eliminated all gear backlash.

The above description has principally mentioned the pan motion of the camera heads. The same apparatus is duplicated for the tilt (up and down) motion. This means the apparatus of FIGS. 5 and 6, and in FIG. 4 from cam 66; two cam actions are provided.

That is, one cam drives two incremental encoders 72 in FIG. 4 by a mechanical tandem structure.

Separate trains of correction pulses for the pan and the tilt camera motion parameters are obtained as empirically determined to be required by the adjustment of separate micrometer thimbles 71, one for pan and one for tilt.

I claim:

1. The method of synchronizing the movement and the optical parameters of at least one slave camera with those of a master camera, which comprises the method steps of;
   (a) forming a train of electrical pulses for each said movement and optical parameter, (b) selectively altering the number of pulses in a said train of electrical pulses to compensate for lack of tracking between the master camera and the slave camera, and (c) actuating the slave camera with the altered said train of electrical pulses.

2. The method of claim 1, in which;

(a) the optical parameter of said slave camera has a given mechanical backlash, (b) the corresponding said optical parameter of said master camera has a greater mechanical backlash than that of said slave camera, and (c) the formation of said train of electrical pulses for the said optical parameter is delayed in time sufficiently to give said optical parameter of said slave camera an apparent mechanical backlash equal to that of the optical parameter of the master camera.

3. The method of claim 2, in which;

(a) the said optical parameter is the focal length of a zoom lens.

4. A synchronized plural-camera system, comprising;

(a) a master camera (21), (b) control signal means (91 to 109, 110) coactive with said master camera to form separate pulse control signals related to both the orientation (91) and to the optical (1) parameters of said master camera, (c) incremental control signal correction means (1 to 57, 58), connected to said control signal means to alter the number of pulses in said pulse control signals by a predetermined amount, and (d) at least on slave camera (24) having both camera orientation (114) and optical (62) parameter pulse-responsive actuating means connected to said control signal means, for synchronous operation of said parameters of said slave camera with said parameters of said master camera.

5. The system of claim 4, in which said control signal means comprises;

(a) first incremental pulse encoder means (91) actuated by horizontal orientation of said master camera, (b) second incremental pulse encoder means (91 ditto) actuated by vertical orientation of said master camera, (c) third incremental pulse encoder means (1) actuated by a change in the optical parameter of said master camera, (d) first (92–110), second (92–110 ditto), and third (2–58) digital control circuits, and (e) corresponding individual connections from said three pulse encoder means to said three digital control circuits.

6. The system of claim 4, in which said incremental control signal correction means comprises;

(a) at least one sub-system (1–36) connected to a control signal means for actuation thereby, (b) digital correction means (63–84) operable by said pulse control signal to form futher pulses, (c) combining means (104–108) to combine said pulse control signal and said further pulses, and (d) output means (111–114) to supply the combined pulse signal for actuation of a said slave camera.

7. The system of claim 6 in which said digital correction means comprises;

(a) stepper motor means (63) electrically connected for control by said pulse control signal, (b) mechanical means (66, 71) driven by said stepper motor means to produce mechanical motion in accordance with a predetermined correction program, and (c) incremental encoder means (72–84) responsive to said mechanical motion for providing electrical digital correction pulses.

8. The system of claim 7, in which said mechanical means comprises;

(a) a cam (66), (b) a mechanical integrator (70), (c) a follower (67) bearing upon said cam and coupled (68,69) to said integrator to actuate said integrator, and (d) mechano-electrical means (72) driven by said integrator to produce an electrical signal corresponding to the mechanical motion of said integrator.

9. The system of claim 8, in which said mechanical integrator includes;

(a) micrometer thimble means (71) to adjust the integration ratio of said mechanical integrator, for establishing the predetermined correction program.

10. The system of claim 6, in which said combining means comprises;

(a) first and second digital signal means, having forward (93–104) and reverse (94–105) motion channels, respectively, to pass said pulse control signal to said output means, (b) third digital signal means (74,78,83) connected to said forward motion channel of said first digital signal means, to pass said further pulses into said pulse control signal to cause said pulse-responsive actuating means to actuate incrementally further forward, and (c) fourth digital signal means (75,79,84) connected to said reverse motion channel of said first digital signal means, to pass said further pulses into said pulse control signal to cause said pulse-responsive actuating means to actuate incrementally backward.

* * * * *